(No Model.)

W. H. COFFELT & J. G. VIERECK, Jr.
SAWING MACHINE.

No. 455,172. Patented June 30, 1891.

Witnesses

William H. Coffelt,
John G. Viereck, Jr.
Inventors by
Attorney

UNITED STATES PATENT OFFICE.

WILLIAM H. COFFELT AND JOHN G. VIERECK, JR., OF DOE BAY, WASHINGTON.

SAWING-MACHINE.

SPECIFICATION forming part of Letters Patent No. 455,172, dated June 30, 1891.

Application filed November 29, 1890. Serial No. 373,055. (No model.)

*To all whom it may concern:*

Be it known that we, WILLIAM H. COFFELT and JOHN G. VIERECK, Jr., citizens of the United States of America, residing at Doe Bay, in the county of San Juan and State of Washington, have invented certain new and useful Improvements in Sawing-Machines; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in sawing-machines.

The object of the invention is to provide a cheap, simple, and effective device whereby trees can be felled or cut at any desired angle; and it consists in the construction and combination of the parts, as will be hereinafter fully set forth, and particularly pointed out in the claims.

Figure 1:
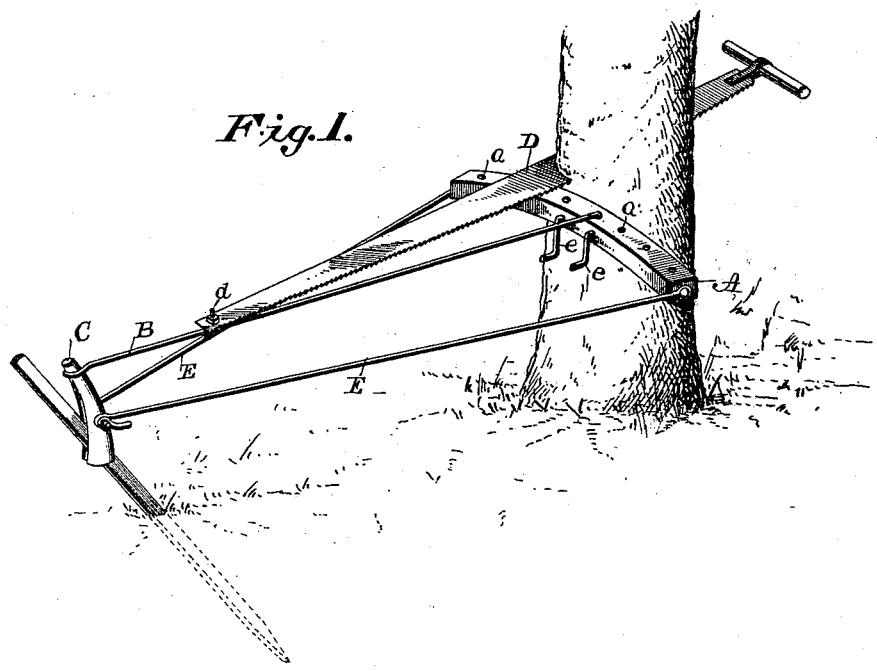
Figure 2:
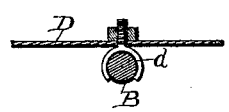
Figure 3:
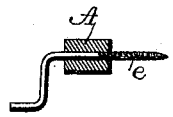

In the accompanying drawings, forming part of this specification, Figure 1 is a perspective view showing the parts arranged in position. Figs. 2 and 3 are detail sectional views.

A refers to a curved bar, which is provided with a series of perforations a, within which the bent end of a rod B is adapted to be placed, the opposite end of said rod being secured to a bifurcated horn C. Upon this rod B is secured the saw-blade D by means of a yoke d, the lower members of which embrace the rod B. Centrally the yoke is provided with an upwardly-projecting member, which passes through a perforation in the end of the saw-blade, where the saw is secured thereto, so as to have a pivotal movement. The opposite end of the saw-blade is provided with the usual handle.

E E refer to rods which are attached to the end of the curved bar A, and are connected to the horn by a bolt and turn-screw, as shown. The horn is secured to a stake or post by a pivot or bolt, which is adapted to be driven into the ground, and supports one end of the frame, as illustrated. The curved bar A is secured to the tree or other piece of lumber to be cut by bolts, as illustrated in Fig. 3, which pass through the bar A, the ends thereof being bent to form crank-handles.

When it is desired to fell a tree, the bar A is secured to the tree at the desired height from the ground by the bolts e, so as to be held either horizontal or at an angle. The stake is then driven into the ground or tree and the bifurcated horn and side rods or braces E secured thereto. The bar upon which one end of the saw slides is then placed in position. When the saw is reciprocated by the operator, one end will be supported by the rod B, while the intermediate portion of the same will rest upon the upper edge of the curved bar A, which will also serve as a guide for said saw. As the sawing proceeds the rod B can be shifted. By means of this device a single operator can operate a saw. The bifurcated horn being curved, as shown, provides for tightening the parts.

Having thus described our invention, what we claim as new, and desire to secure by Letters Patent, is—

1. The combination, in a sawing-machine, of a curved bar A, having a series of vertical perforations, brace-rods E E, connecting the same to a horn C, a rod B, secured at one end to the horn C, the opposite end being bent for engagement with a perforation in the bar A, and a yoke carried by said rod, to which the saw-blade is attached, substantially as set forth.

2. The combination, in a sawing-machine, of a post or stake having a horn C secured thereto, a curved bar A, secured to said horn by rods E, an adjustable rod B, secured at one end to the horn C and adapted to engage with a perforation in the curved bar A, a saw-blade movably mounted on the rod B, and bolts e, having bent ends, said bolts passing through the bar A, substantially as set forth.

3. In a sawing-machine, the combination, in a curved bar A, having vertical perforations a, of bolts e, having crank-handles and threaded ends, brace-rods E, connected to the curved bar and to a horn, a saw-supporting rod pivotally secured to the horn and provided with a bent end adapted to engage the perforations $a$ in the bar A, said rod carrying a fixture for connecting the saw-blade to the rod B, so that it can slide thereon, and a stake pivoted between the furcated portions of the horn, the parts being organized substantially as shown, and for the purpose set forth.

In testimony whereof we affix our signatures in presence of two witnesses.

WILLIAM H. COFFELT.
JOHN G. VIERECK, JR.

Witnesses:
M. HUTCHINSON,
G. M. JOHNSON.